Sept. 24, 1929.   W. I. CLEMENTS   1,729,566
WIND AND RAIN DEFLECTOR FOR WINDSHIELDS
Filed Feb. 9, 1928   2 Sheets-Sheet 2
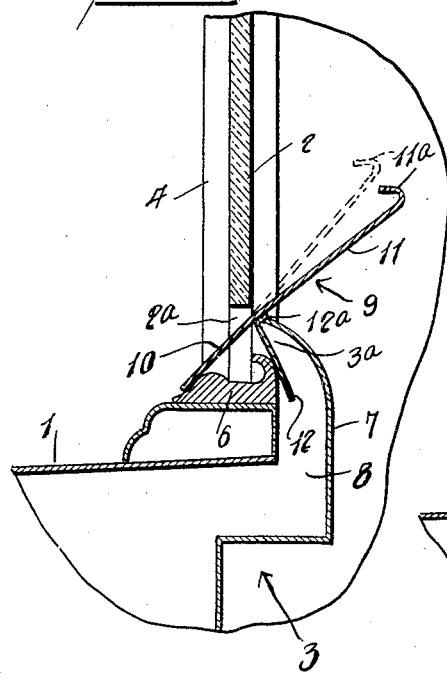
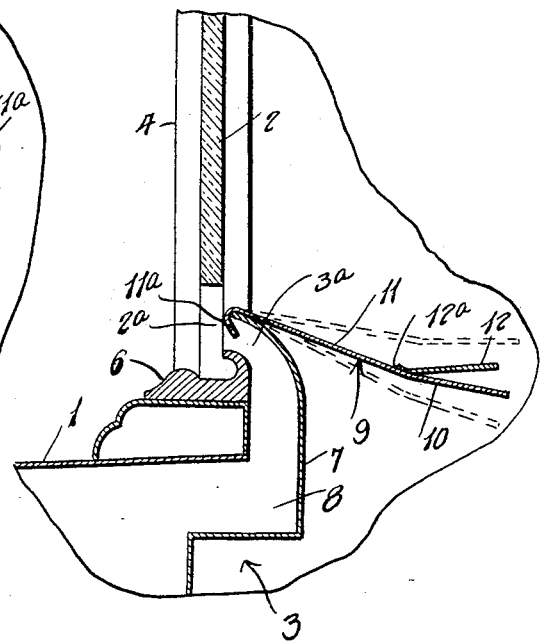
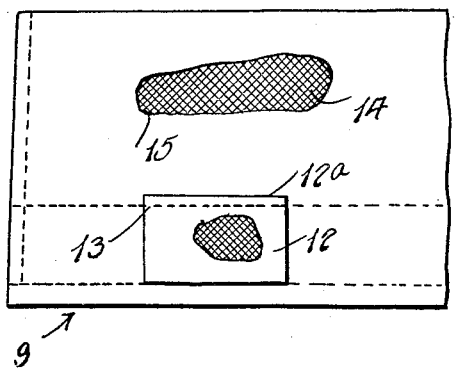
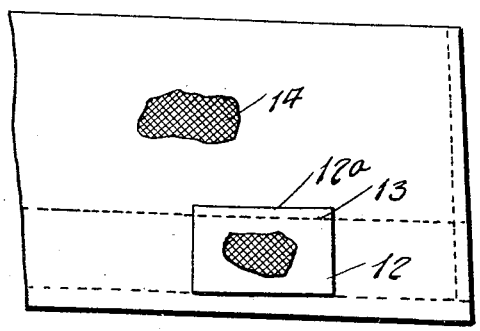
Inventor
W. I. Clements Patented Sept. 24, 1929

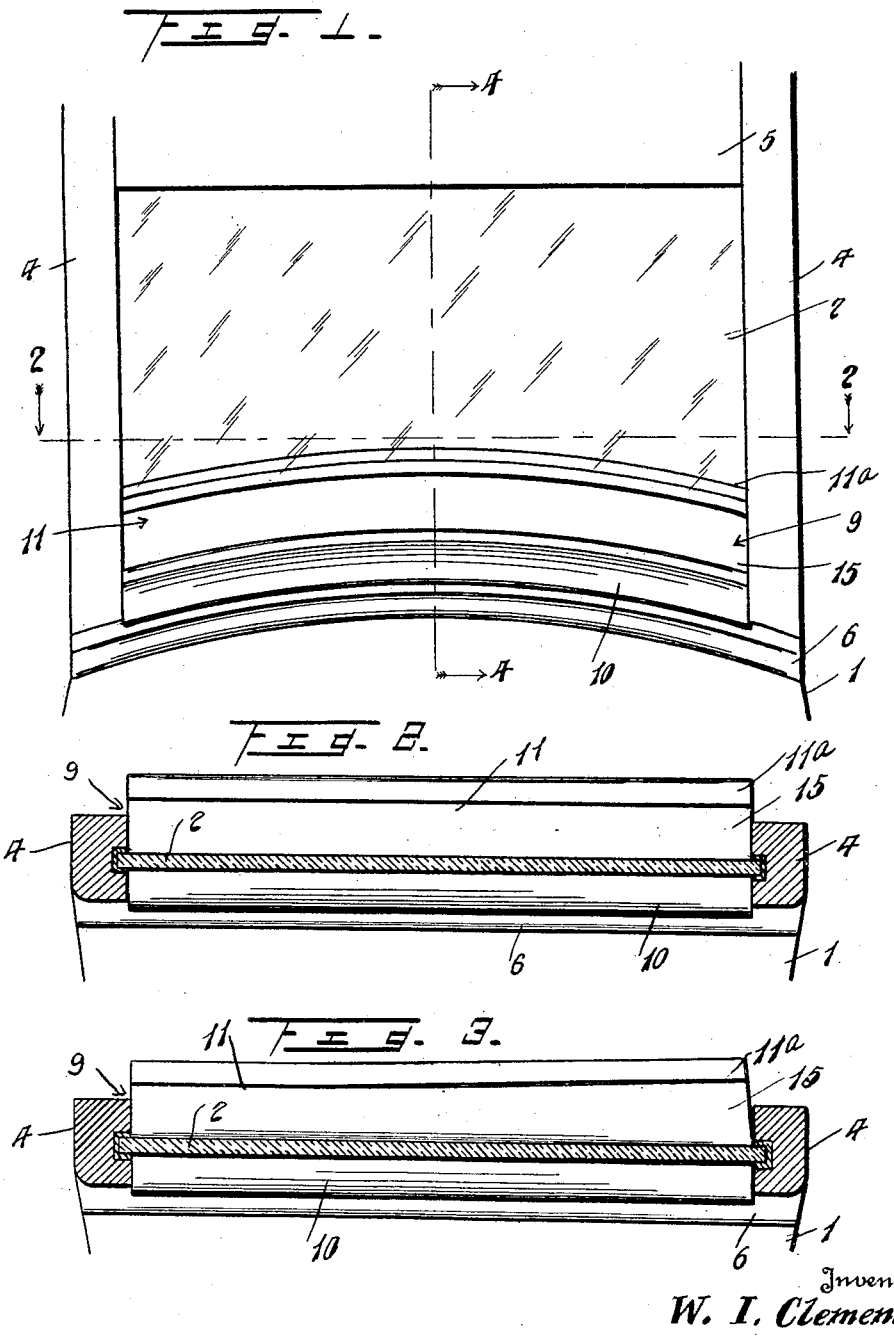

1,729,566

UNITED STATES PATENT OFFICE

WELLINGTON I. CLEMENTS, OF NORFOLK, VIRGINIA

WIND AND RAIN DEFLECTOR FOR WINDSHIELDS

Application filed February 9, 1928. Serial No. 253,108.

This invention relates to an attachment for automobiles of the closed body type, and more particularly to automobiles of this kind that are provided with slidably mounted windshields and with ventilators extending across the lower side of the windshield frames and adapted when opened to direct air downwardly into the automobiles close to the feet of the occupants of the front seats. The windshields constitute closures for the ventilators, and the ventilators are opened by raising of the windshields and closed by lowering of the windshields. These windshields and ventilators are objectionable inasmuch as, when the windshields are raised during rainy or cold weather, water or cold air enters the automobiles by way of the ventilators and by way of the openings provided by the raising of the windshields, and due thereto the automobiles cannot be ventilated through the medium of the windshield and ventilator during such weather with any degree of comfort to the occupants of the front seat.

The invention has for one of its objects to overcome this disadvantage, and to attain this end comprehends the provision of an attachment which shall be adapted to extend across and close the ventilator when the windshield is raised so as to prevent air and water entering the automobile by way of the ventilator, which shall be adapted to extend from the upper side of the ventilator to a line above the lower edge of the windshield so as to prevent water entering the automobile by way of the windshield opening, and which shall be so related to the windshield as to permit air to enter the automobile by way of the windshield opening without subjecting the occupant to drafts.

The invention has for a further object to provide an attachment of the character stated which shall be adapted to close the ventilator and upwardly deflect the air entering the automobile through the windshield opening.

The invention has for a further object to provide an attachment or wind and rain deflector of the character stated which shall be adapted to be so arranged as to permit the passage of air through the ventilator and to upwardly deflect the air entering the automobile through the windshield opening.

The invention has for a further object to provide a wind and rain deflector of the character stated which may be readily adjusted to vary the angular path of the air as it enters the automobile so as to permit the air to be directed above or below the heads of the occupants of the front seat of the automobile.

The invention has for a further object to provide a wind and rain deflector of the character stated which shall be adapted to be readily adjusted to permit the air entering at one side of the windshield opening to be deflected upwardly at a different angle from the angle of the upward deflection of the air entering the other side of the opening so as to permit the ventilation of the automobile in a manner to suit the requirements of persons of different sizes, as for instance an adult and a child occupying the front seat.

The invention has for a further object to provide a wind and rain deflector of the character stated which may be manufactured and sold at low cost, which may be readily and quickly arranged in operative position on the automobile, and which may be readily removed and supported within convenient reach of the operator so as to permit of its application for use in a short time.

With the foregoing and other objects in view, the nature of which will appear as the description proceeds, the invention consists in the construction, combination and arrangement of parts hereinafter fully described and claimed, and illustrated in the accompanying drawings, wherein:

Figure 1 is an elevational view of the front part of an automobile equipped with a wind and rain deflector constructed in accordance with my invention, the windshield being shown raised and the deflector being shown arranged or adjusted to deflect all air entering the automobile upwardly at a uniform angle.

Figure 2 is a sectional view taken on the horizontal plane indicated by the line 2—2 of Figure 1, Figure 3 is a view similar to Figure 2 illustrating the wind and rain deflector adjusted to cause the air entering at opposite sides of the windshield opening to be deflected upwardly at different angles.

Figure 4 is a sectional view taken on the vertical plane indicated by the line 4—4 of Figure 1, Figure 5 is a view similar to Figure 4 illustrating the wind and rain deflector arranged to permit the passage of air through the ventilator and to upwardly deflect the air passing through the windshield opening, and Figure 6 is an elevational view of the wind and rain deflector.

Referring in detail to the drawings, 1 designates the cowl, 2 the windshield and 3 the ventilator of an automobile of the closed body type. The windshield 2 is slidably supported by a frame which consists of the front corner posts 4 and the front cross bar 5 of the body of the automobile. The ventilator 3 extends across the lower side of the windshield frame, and is adapted when opened to direct air downwardly into the forward part of the automobile body close to the feet of the occupant or occupants of the front seat. The ventilator 3 comprises a front member 6 and a rear member 7 which are so arranged with respect to each other and to the cowl 1 as to provide a passage 8 through which the air travels when the ventilator is opened. The windshield 2 constitutes a closure for the ventilator 3, and when it is in fully lowered or closed position its lower edge rests upon the member 6 which is made from rubber. When the windshield 2 is raised above the members 6, as shown in Figures 4 and 5, the ventilator 3 is opened and air will enter the automobile by way of the ventilator and by way of the opening provided by raising the windshield. During cold rainy weather cold air or water will enter the automobile through the ventilator 3 and the windshield opening 2ª, with the result that the automobile cannot be ventilated during such weather with any degree of comfort to the occupant or occupants of the front seat.

The wind and rain deflector 9 constituting the subject-matter of this invention and adapted to overcome this disadvantage rests upon the ventilator members 6 and 7 and extends entirely across the windshield frame. The deflector 9 comprises a lower portion 10 which extends across and closes the intake opening 3ª of the ventilator 3 and an upper portion 11 which extends across but does not close the windshield opening 2ª. The deflector members 10 and 11 have a slight angular relation and are formed integrally, and at the juncture of the members the deflector is provided with retaining tabs 12 which are positioned between and contact with the ventilator members 6 and 7. The tabs 12 are secured to the under side of the deflector 9, as shown at 13, and their upper edges 12ª contact with the ventilator member 7. This contact between the edges of the tabs 12 and ventilator member 7, and the frictional contact between the tabs and ventilator members 6 and 7, hold the deflector 9 against accidental displacement by the vibration of the automobile and the pressure of wind against the deflector.

The deflector member 10 prevents air and water from entering the automobile through the ventilator 3. The deflector member 11 extends above the lower edge of the windshield 2 and is provided with a forwardly bent upper edge portion 11ª which prevents water from entering the automobile through the windshield opening 2ª and which deflects the air passing through the opening upwardly into the automobile.

The deflector 9 is made from any material that may be readily bent and will retain its bent form. The material may be solid or reticulated, and it is covered at its front and rear side with any water-proof material suitable for the purpose. Wire cloth may be employed, as shown at 14 in Figure 6, and the covering 15 will be colored to match the paint or trim of the automobile. The tabs 12 and their covers are made from similar materials.

The air entering the automobile through the windshield opening 2ª will be deflected against the rear side of the windshield 2 by the deflector 9, and due thereto the air will enter the automobile in an upwardly and rearwardly inclined direction or path. The angle of this path may be varied by moving the upper end 11ª of the deflector member 11 toward and away from the windshield 2, as suggested in Figure 4. If desired, the air entering the automobile through one side of the windshield opening 2ª may be caused to travel in a path at a greater angle to the horizontal than the air entering through the other side of said windshield opening, whereby to ventilate the automobile in a manner satisfactory to persons of different size on the front seat, as for instance when an adult and a child occupy the front seat. This may be done by bending the deflector member 11 in a manner to position different portions thereof at different distances from the windshield 2, as suggested in Figure 3.

The windshield 2 may be closed without removing the deflector 9, as will be apparent. The windshield 2 may be adjusted to vary the vertical dimension of the opening 2ª. When it is desired to remove the deflector 9, it is only necessary to grasp the same and pull it upwardly rearwardly from between the ventilator and the windshield frame. The deflector 9 when not in use may be suspended from the upper edge of the ventilator member 7 through the medium of its bent upper edge 11ª, as shown in Figure 5. When in this position, the automobile may be ventilated through the ventilator 3 and windshield opening 2ª, and the air entering through the opening will be deflected upwardly against the chest and face of the occupant or occupants of the front seat. The deflection of the air may be varied by bending the deflector so as to cause it to occupy different angular positions with respect to the horizontal, as suggested in Figure 5.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

1. In combination, a windshield, the frame therefor, a ventilator extending across the lower side of the frame, and a wind and rain deflector extending diagonally through the windshield opening and across the lower side of the frame and having a member closing the ventilator and a member extending upwardly and rearwardly from said first member and provided at its upper edge with a forwardly bent portion.

2. In combination, a windshield, the frame therefor, a ventilator extending across the lower side of the frame, a wind and rain deflector extending diagonally through the windshield opening and across the lower side of the frame, and a tab carried by the deflector and extending into the ventilator.

3. In combination, a windshield, the frame therefor, a ventilator extending across the lower side of the frame and having front and rear members, a wind and rain deflector extending diagonally through the windshield opening and across the lower side of the frame, and a tab secured to the deflector and having certain edges thereof contacting with one of the ventilator members.

4. A wind and rain deflector of the character set forth, comprising a member of elongated rectangular contour, said member comprising portions adapted to be readily bent to assume different angles with relation to each other for the purpose specified, and attaching means connected to one side of the member between the longitudinal edges thereof.

In testimony whereof I affix my signature.

WELLINGTON I. CLEMENTS.